US012474080B2

(12) United States Patent
Godbout et al.

(10) Patent No.: US 12,474,080 B2
(45) Date of Patent: Nov. 18, 2025

(54) VENTILATION REGULATION SYSTEM, AIR REGULATION APPARATUS FOR USE THEREWITH AND DRUM SEGMENT FORMING PART OF THE REGULATION APPARATUS

(71) Applicant: EFFECTIV Inc., Blainville (CA)

(72) Inventors: François Godbout, Sainte-Anne-des-Lacs (CA); Vishalkumar Patel, Etobicoke (CA)

(73) Assignee: EffectiV Inc., Blainville (CA)

( * ) Notice: Subject to any disclaimer, the term of this patent is extended or adjusted under 35 U.S.C. 154(b) by 356 days.

(21) Appl. No.: 18/043,236

(22) PCT Filed: Aug. 26, 2021

(86) PCT No.: PCT/CA2021/051184
§ 371 (c)(1),
(2) Date: Feb. 27, 2023

(87) PCT Pub. No.: WO2022/040801
PCT Pub. Date: Mar. 3, 2022

(65) Prior Publication Data
US 2023/0332800 A1  Oct. 19, 2023

Related U.S. Application Data

(60) Provisional application No. 63/070,959, filed on Aug. 27, 2020.

(51) Int. Cl.
*F24F 13/10* (2006.01)
(52) U.S. Cl.
CPC ........ *F24F 13/105* (2013.01); *F24F 2221/28* (2013.01)
(58) Field of Classification Search
CPC .... F24F 13/105; F24F 2221/28; F24F 1/0047; F24F 1/0317; F24F 1/64; F24F 7/10;
(Continued)

(56) References Cited

U.S. PATENT DOCUMENTS

| 4,316,407 A | 2/1982 | Lambert |
| 2015/0368961 A1 | 12/2015 | Horn |

(Continued)

FOREIGN PATENT DOCUMENTS

| EP | 2390123 B1 * | 8/2015 | ......... B60H 1/00842 |
| JP | 2003185186 A * | 7/2003 | ............... E04B 1/70 |

(Continued)

OTHER PUBLICATIONS

Kawazoe, Yuji, JP2003185186 Translation.pdf, "Ventilating direction controller and building equipped therewith", Jul. 2003, pp. 1-22.*

(Continued)

*Primary Examiner* — Avinash A Savani
*Assistant Examiner* — Ryan L Faulkner
(74) *Attorney, Agent, or Firm* — Jacob M. Ward; Ward Law Office LLC

(57) ABSTRACT

The ventilation regulation system comprises a ventilation duct including a ventilation opening through a separating wall of the ventilation duct. An air regulation apparatus is provided within the ventilation opening for regulating the air flow therethrough, and comprises a modular air regulation drum member that has a number of rotatable drum segments that can each rotate to adjustably block or deflect the air flow through the ventilation opening such that at least one among the direction, the speed and the debit rate of air is controlled through the ventilation opening. A mechanical coupling mechanically links the drum segments of the drum member into a coordinated rotational movement. An actuator acting on at least one, but not all, of the drum segments of the drum member, rotates one of the drum segments, with the mechanical coupling allowing all drum segments to be rotated when that one drum segment is rotated.

15 Claims, 17 Drawing Sheets

(58) Field of Classification Search
CPC ...... F24F 13/0227; F24F 13/06; F24F 13/068; F24F 2221/14; F24F 1/0022; F24F 2013/1446
USPC .......................................................... 454/284
See application file for complete search history.

(56) References Cited

U.S. PATENT DOCUMENTS

2020/0386045 A1* 12/2020 Lemaitre ................. E06B 9/44
2023/0175728 A1*  6/2023 Hong ................... F24F 1/0014
                                                                454/339

FOREIGN PATENT DOCUMENTS

| KR | 100815484 B1 | 3/2008 | |
|---|---|---|---|
| KR | 20140089068 A | 7/2014 | |
| KR | 20170000693 A | 1/2017 | |
| WO | WO-2024149647 A1 * | 7/2024 | ............. E06B 9/171 |

OTHER PUBLICATIONS

Kullen, Philipp, EP2390123 Translation.pdf, "Assembly for controlling at least teo air flows", Nov. 2011, pp. 1-11.*
Written Opinion of the International Searching Authority dated Nov. 22, 2021.

* cited by examiner

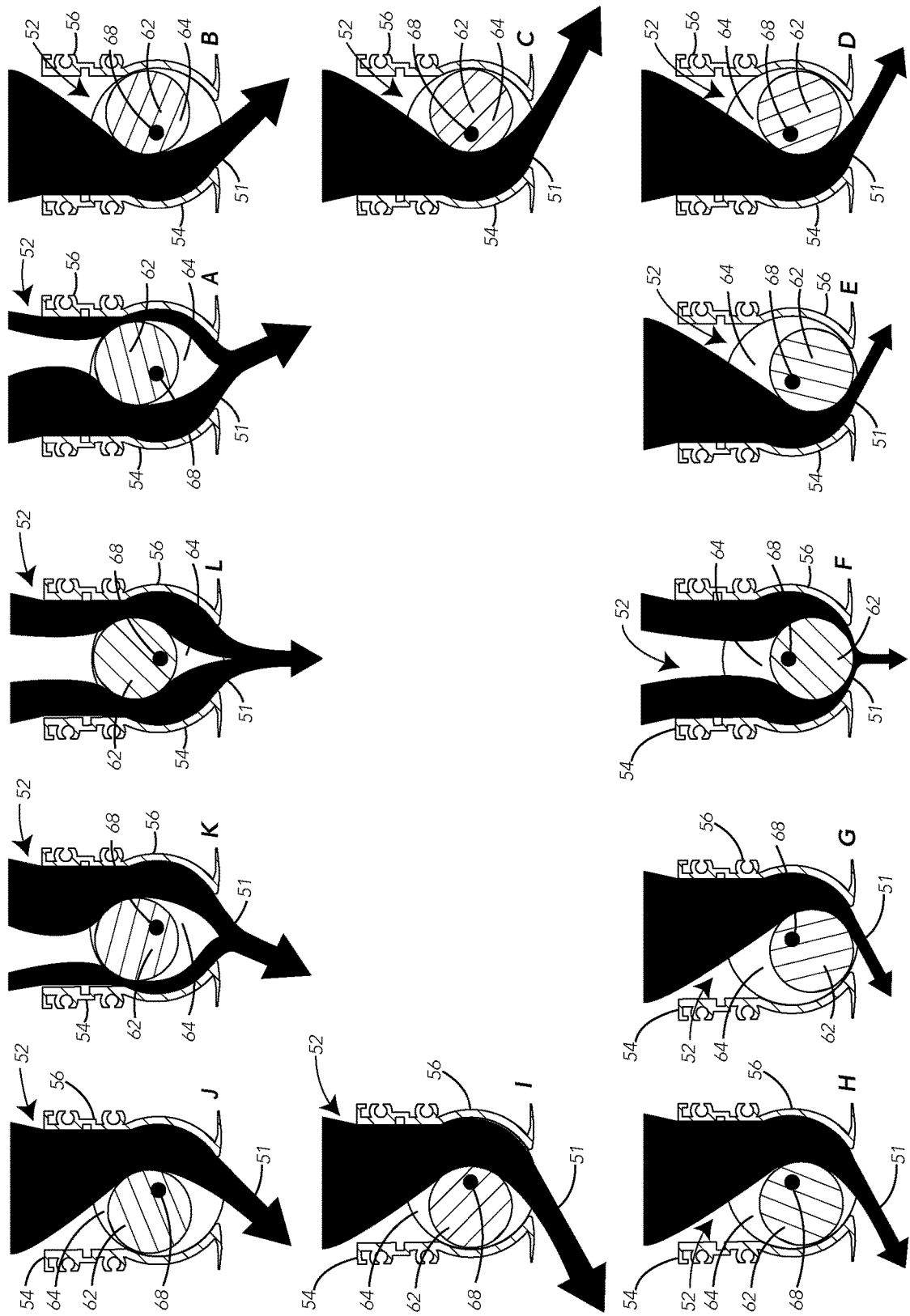

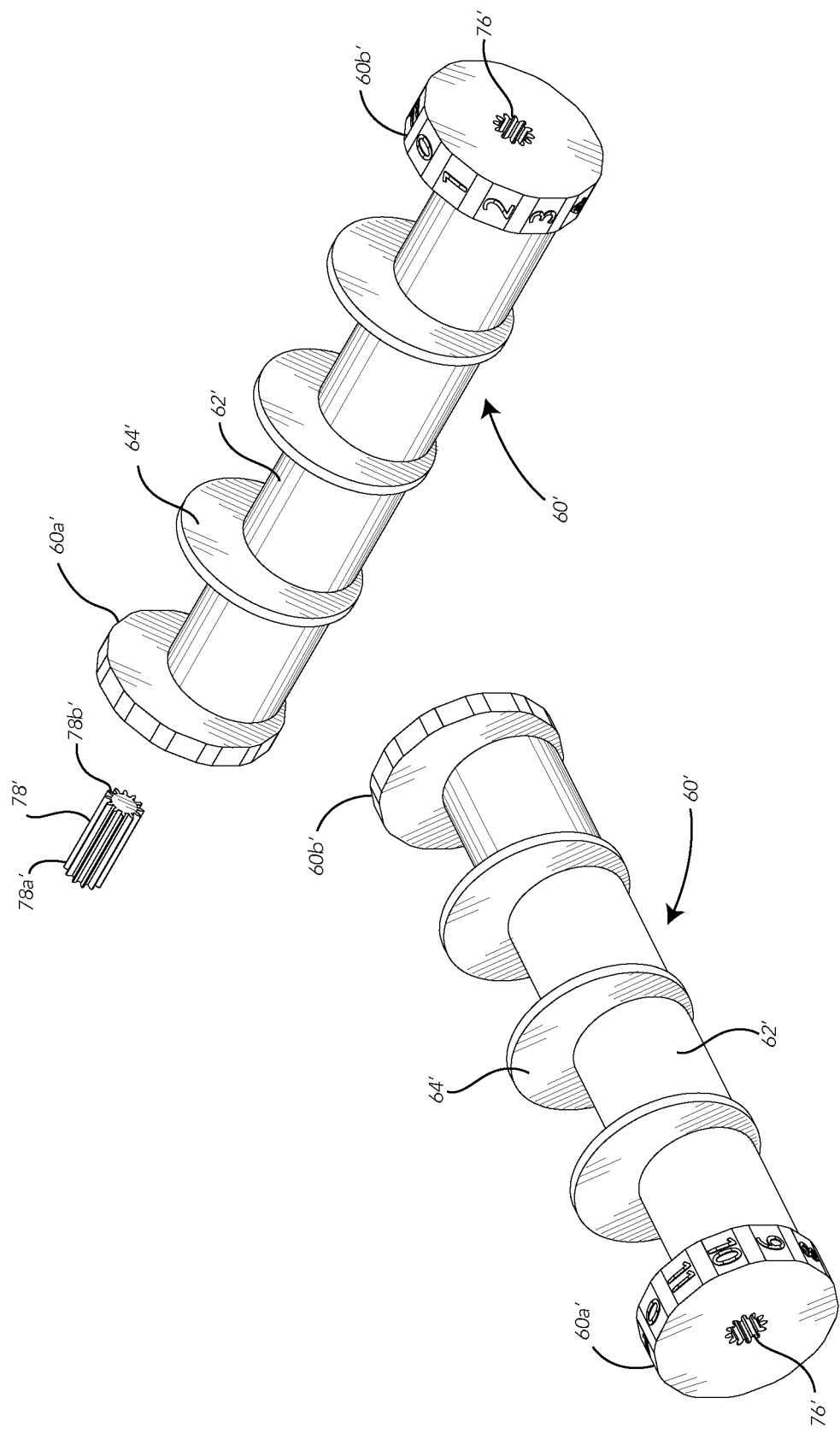

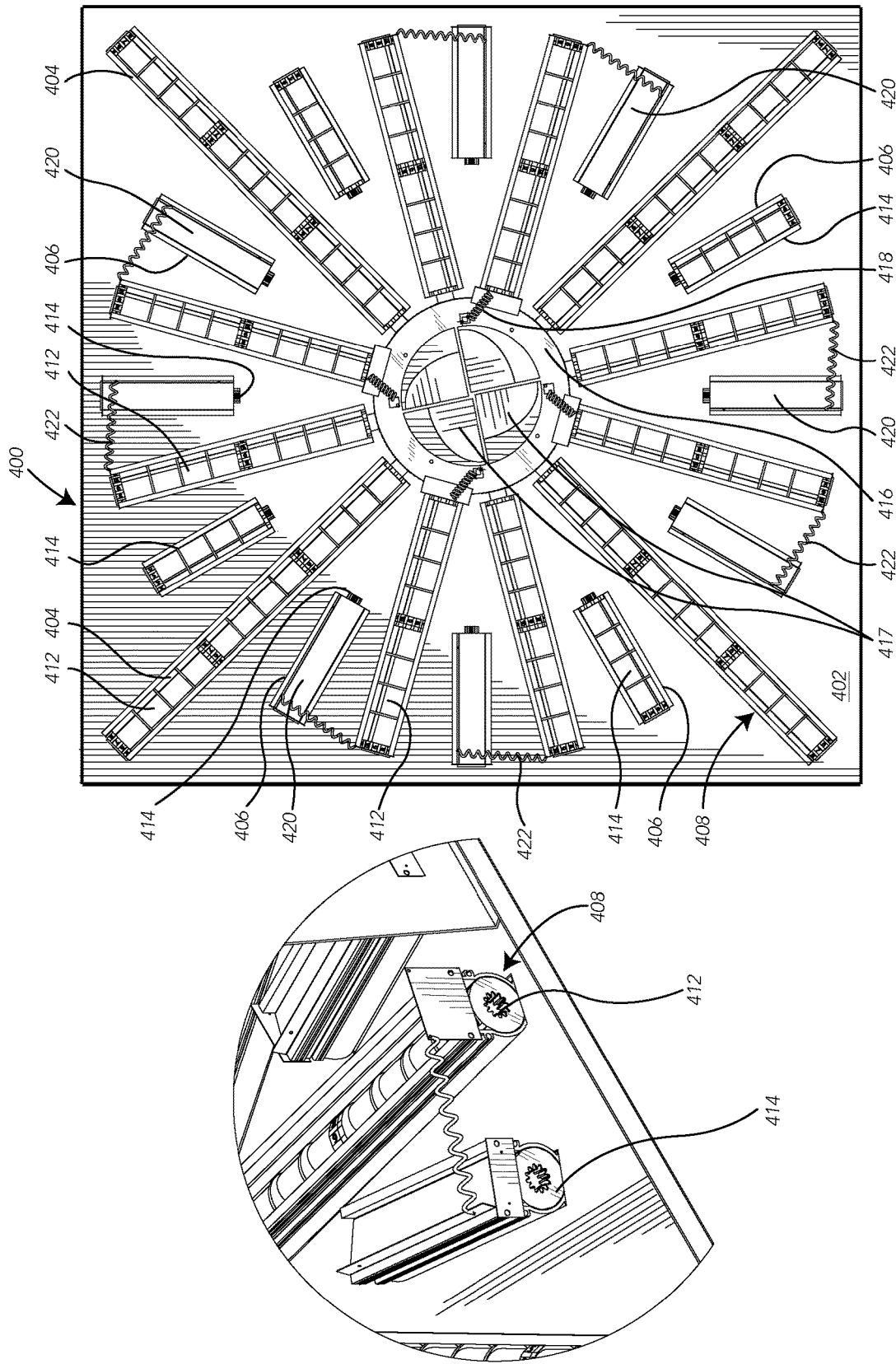

VENTILATION REGULATION SYSTEM, AIR REGULATION APPARATUS FOR USE THEREWITH AND DRUM SEGMENT FORMING PART OF THE REGULATION APPARATUS

CROSS-REFERENCE DATA

This application is a National Stage of International Application No. PCT/CA2021/051184, filed Aug. 26, 2021, which in turn claims the benefit of U.S. Provisional Patent Application No. 63/070,959, filed Aug. 27, 2020. The entire disclosures of the above applications are incorporated herein by reference.

FIELD OF THE INVENTION

The present invention generally relates to ventilation regulation systems for regulating the air flow to be supplied to a destination area such as a room within a building, and more particularly to a ventilation regulation system that has an air regulation apparatus that includes a modular drum member formed of a number of mechanically coupled drum segments that, when rotated, regulate the air flow that is distributed to the destination area.

BACKGROUND OF THE INVENTION

Ventilation regulation systems are used to supply air into the rooms of a building. The air being supplied may be warmed or cooled compared to the room temperature, as known in the art. Ventilation regulation systems include air ducts that are fed with air by a fan to have positive air pressure therein, and either have ventilation openings that are either provided directly in the air ducts, or that are provided in a plenum to which the air duct is connected.

It is desirable to control or regulate the air supply through the air ventilation opening into a room, through a ventilation regulation system. There are different ways to go about doing this, for example pivotable slats may be provided in the ventilation opening and by pivoting the slats, the functional size of the ventilation opening is varied; and once pivoted into an inclined position, the slats may further deflect air into the room towards a desired direction.

Since warmer air is less dense and will naturally rise towards the ceiling in a room, if cooler air is injected into a warmer room, it is advantageous to orient the cool air flow near and along the ceiling, and consequently if the ventilation opening is provided near the ceiling the air may be injected into the room generally parallel to the ceiling and at lower speed. Inversely, if warmer air is injected into a cooler room, it is advantageous to orient the warm air flow towards the floor, and consequently if the ventilation opening is near the ceiling the air may be injected into the room generally perpendicularly to the ceiling and at higher speed. In both instances, the purpose is to allow the air injected into the room to mix with the existing ambient air as much as possible to end up with a homogeneous interior environment.

Existing air regulation apparatuses include flat pivotable slats as described above, but also cylindrical drums that have spaced-apart annular fins provided about a cylindrical main body. The main body is eccentrically disposed relative to the fins, such that by rotating the drum, the main body blocks the ventilation opening more or less, with the air flow passing about the main body between the annular fins being consequently controlled. However, such devices require a user to actually move each individual drum, one by one, to adjust the air flow at the ventilation opening, which is a tedious task when it has to be done throughout a building. It is, ultimately, often not accomplished all by the maintenance personnel because of this tediousness.

SUMMARY OF THE INVENTION

Accordingly, the present invention relates to a ventilation regulation system for conducting air being forced from an air supply area to a destination area, comprising:
  a separating wall between said air supply area and said destination area;
  a ventilation opening through said separating wall for allowing air flow therethrough;
  an air regulation apparatus provided at least partly within said ventilation opening for regulating the air flow through the ventilation opening, said air regulation apparatus comprising:
    a modular air regulation drum member that has a number of rotatable drum segments that can each rotate to adjustably block or deflect the air flow through said ventilation opening such that at least one among the direction, the speed and the debit rate of air is controlled through the ventilation opening;
    a mechanical coupling mechanically linking said drum segments of said drum member into a coordinated rotational movement; and
    an actuator acting on at least one, but not all, of said drum segments of said drum member to rotate said at least one of said drum segments, with the mechanical coupling allowing all drum segments to be rotated when said at least one drum segment is rotated.

In one embodiment, each said drum segment comprises:
  a generally cylindrical main body that has a longitudinal axis that extends through a center of said cylindrical main body between the drum segment first and second ends;
  annular fins that extend radially about said main body and that are disposed about a fin axis that extends through a center of said annular fins between the drum segment first and second ends, with said main body longitudinal axis being parallel but spaced apart from said fin axis; and
  coupling members, which at least partly compose said mechanical coupling, at each end of said drum segment for allowing said drum segment to be attached to other drum segments in end-to-end relationship to form said drum member;
wherein when said drum segment rotates, said cylindrical main body moves relative to said ventilation opening.

In one embodiment, the separating wall comprises elongated side walls on either side of said ventilation opening that have an arcuate portion between which said drum segments can rotate about said fin axis, with said cylindrical main body further moving relative to said side walls when said drum segment rotates.

In one embodiment, said actuator automatically rotates said drum member in reaction to a determined value of a parameter of the air being injected into the air supply area, the parameter being one of debit rate, pressure, temperature, and speed.

In one embodiment, a number of said drum segments are joined in end-to-end relationship to form said drum member, with said mechanical coupling comprising, on each said drum segment, a male coupling member at a first end and a complementary female coupling member on a second end, whereby each two adjacent drum segments can be endwisely attached to each other with their respective male and female coupling members engaging one another.

In one embodiment, said male coupling member comprises a geared outer surface and said female coupling member comprises a complementary toothed sleeve to receive said geared outer surface of said male coupling member therein.

In one alternate embodiment, said drum segments are joined in end-to-end relationship to form said drum member, with said mechanical coupling comprising:
  on each said drum segment, a female coupling member at each end of each said drum segment; and
  a drum segment connector having a pair of male coupling members engaging the female coupling members of two endwisely adjacent drum segments whereby each two adjacent drum segments can be endwisely connected to each other.

In one embodiment, said male coupling members comprise a geared outer surface and said female coupling members comprise a complementary toothed sleeve to receive said geared outer surface of said male coupling members therein.

In one embodiment, said actuator comprises thermal actuators capable of rotating the drum member as a result of the temperature of the air flowing into the air supply area.

In one embodiment, the ventilation regulation system further comprises additional spaced-apart ventilation openings, with said air regulation apparatus being also provided at least partly within said additional ventilation openings for regulating the air flow through the additional ventilation openings, said air regulation apparatus further comprising:
  additional modular air regulation drum members that each have a number of rotatable drum segments that can each rotate to adjustably block or deflect the air flow through said additional ventilation openings for controlling at least one among the direction, the speed and the debit rate of air through the additional ventilation openings; and
  a mechanical coupling mechanically linking said drum segments of all said drum members into a coordinated rotational movement;
wherein said actuator acts on at least one, but not all, of said drum segments of all said drum members to rotate said at least one of said drum segments, with the mechanical coupling allowing all said drum segments to be rotated when said at least one drum segment of one drum member is rotated.

In one embodiment, said actuator comprises blades disposed in said air supply area, said blades linked to a blade connector linked to said drum members, such that air speed within the air supply area will correspondingly force said blade connector to move which will, in turn, rotate said drum members.

In one embodiment, said blade connector is rotatable, and said ventilation openings and said drum members extend radially away from said blade connector.

The present invention further relates to an air regulation apparatus for use with a ventilation regulation system for conducting air being forced from an air supply area to a destination area, the ventilation regulation system of the type comprising a separating wall between the air supply area and the destination area and a ventilation opening through the separating wall for allowing air flow therethrough, said air regulation apparatus for installation at least partly within the ventilation opening for regulating the air flow through the ventilation opening, said air regulation apparatus comprising:
  a modular air regulation drum member that has a number of rotatable drum segments that can each rotate to adjustably block or deflect the air flow through said ventilation opening such that at least one among the direction, the speed and the debit rate of air is controlled through the ventilation opening;
  a mechanical coupling mechanically linking all drum segments of said at least one drum member into a coordinated rotational movement; and
  an actuator acting on at least one, but not all, of said drum segments of said drum member to rotate said at least one of said drum segments, with the mechanical coupling allowing all drum segments to be rotated when said at least one drum segment is rotated.

The invention also relates to an elongated drum segment for use in forming, with other drum segments, a modular air regulation drum member that is part of an air regulation apparatus of a ventilation regulation system, the drum segment having first and second ends and comprising:
  a generally cylindrical main body having a longitudinal axis that extends through a center of said cylindrical main body between the drum segment first and second ends; and
  a mechanical coupling member at each end of said drum segment for allowing said drum segment to be attached to the other drum segments in end-to-end relationship for forming the modular air regulation drum member for use in blocking or deflecting the air flow through the ventilation opening for adjusting at least one among the direction, the speed and the debit rate of air through the ventilation opening.

In one embodiment, the drum segment further comprises:
  annular fins that extend radially about said main body and that are disposed about a fin axis that extends through a center of said annular fins between the drum segment first and second ends, with said main body longitudinal being parallel but spaced apart from said fin axis; and
  elongated side walls having an arcuate portion between which said fins are snugly rotatably fitted, with said cylindrical main body moving relative to said side walls when said drum segment rotates between the side walls about said fin axis.

BRIEF DESCRIPTION OF THE DRAWINGS

In the annexed drawings:

FIG. 5 comprises a series of schematic cross-sectional views numbered A to L of one drum segment with its side walls showing how the air speed and direction varies depending on the position of the drum segment's main body;

FIG. 6 is a perspective view of a pair of drum segments forming a drum member of the air regulation apparatus FIG. 1 according to another embodiment;

FIG. 17 is a perspective view, at a larger scale, of a portion of the plenum casing and of the ends of a few drum members of the ventilation regulation system of FIG. 16;

FIG. 18 is a top plan view of the bottom wall of the plenum casing together with the air regulation apparatus of the ventilation regulation system of FIG. 16;

DETAILED DESCRIPTION OF THE EMBODIMENTS

Figure 1:
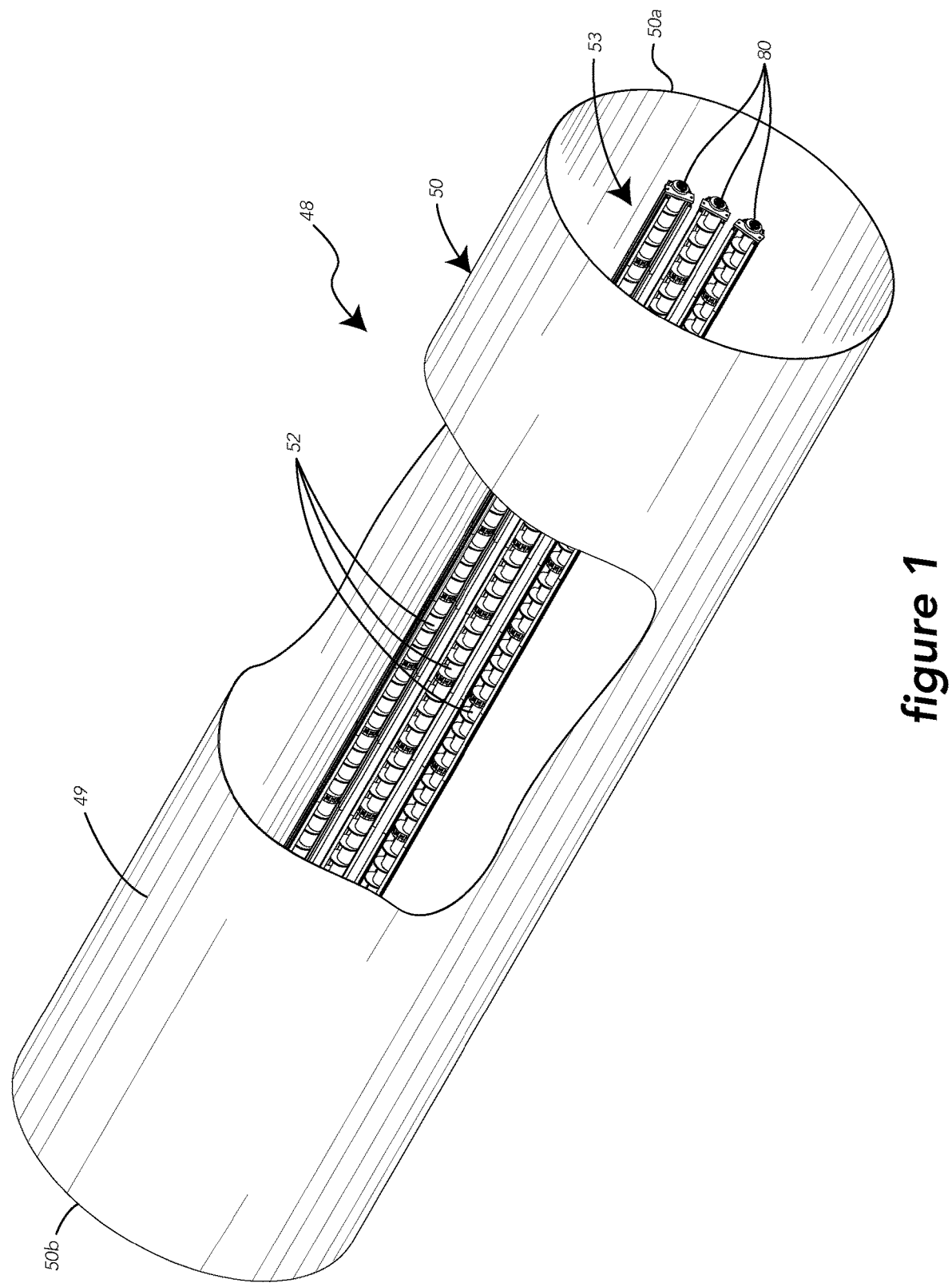
FIG. 1 is a perspective view of a ventilation regulation system according to a first embodiment of the invention, showing part of a ventilation duct equipped with an air regulation apparatus.
Figure 2:
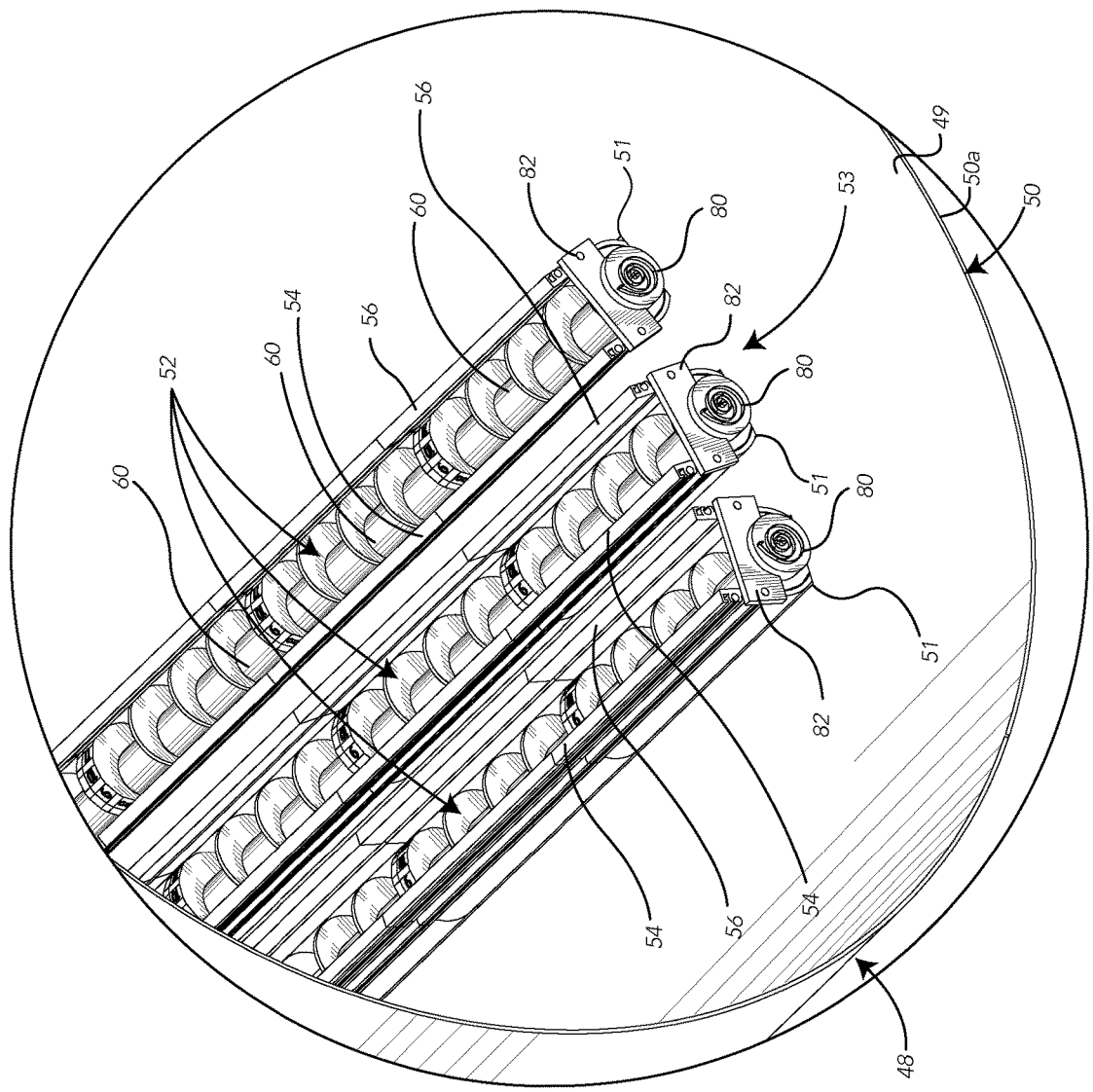
FIG. 2 is an enlarged perspective view of a portion of the ventilation duct and the air regulation apparatus of FIG. 1.
Figure 3:
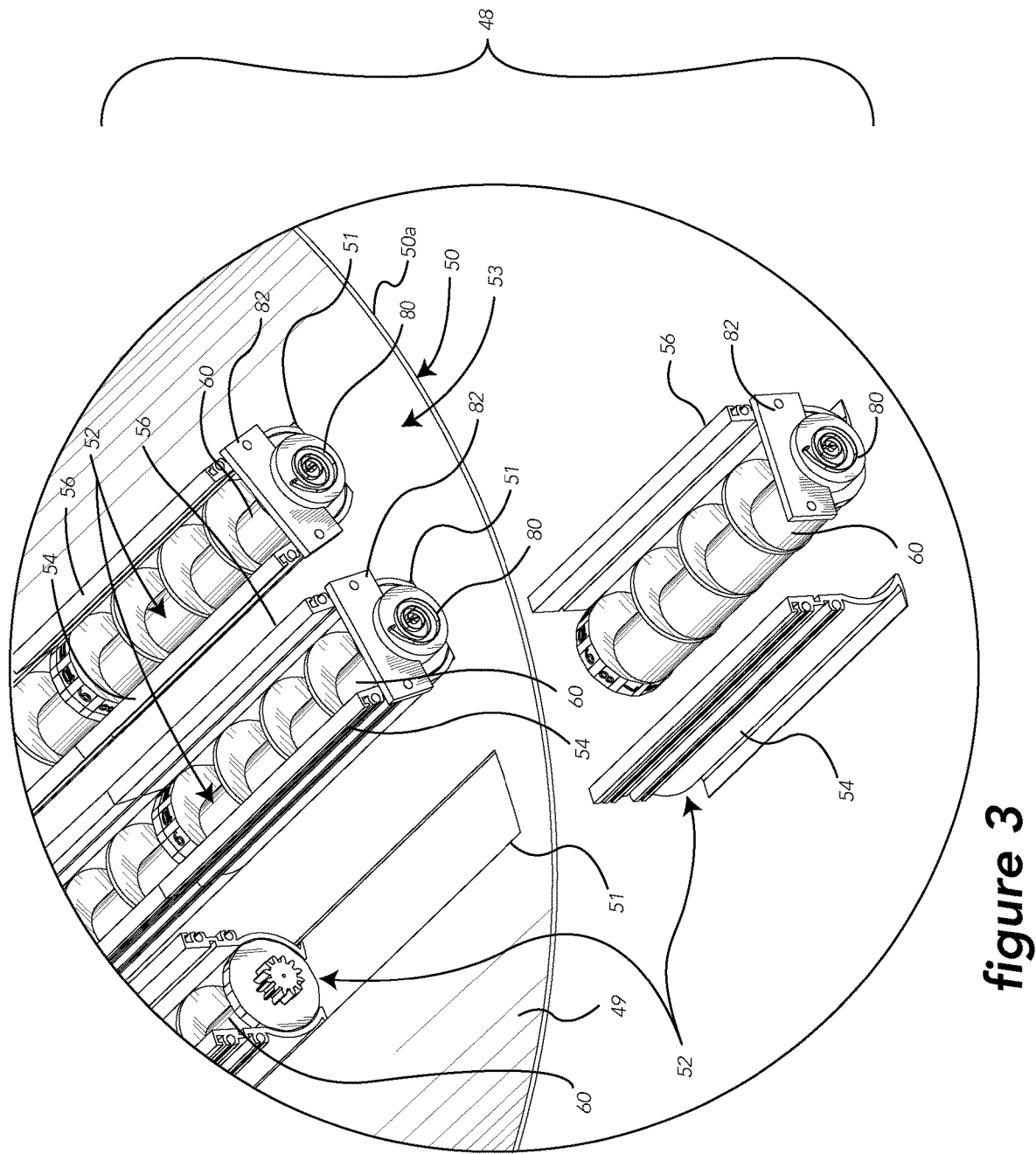
FIG. 3 is an enlarged perspective view of a portion of the ventilation duct and air regulation apparatus of FIG. 2, showing one drum segment and its associated side walls being exploded away from its drum member.

FIGS. 1-3 show a ventilation regulation system 48 according to a first embodiment of the invention that comprises a ventilation duct 50 for use in providing ventilation in a desired destination area such as within a room of an industrial or commercial building. Ventilation duct 50 is operatively connected to an air source (not shown) that includes conventional components (not shown) for a ventilation system such as an air pump, air filters, air heating devices, air cooling devices, humidifiers, condensers, etc . . . . The space within ventilation duct 50 is consequently said to represent an air supply area for supplying air with desired parameters (debit, temperature, humidity, etc . . . ) to the destination area that is the room that is ventilated. Air flows through ventilation duct 50 from an upstream end 50a to a downstream end 50b. Ventilation duct comprises a separating wall 49, which is cylindrical in shape in the exemplary embodiment of FIG. 1, that separates the air supply area within duct 50 from the destination area.

Ventilation duct 50 comprises three elongated ventilation openings 51 such that air within duct 50 may pass through ventilation openings 51 to exit duct 50 into the destination area. It is understood that any number of ventilation openings could be provided instead of three.

According to the present invention, ventilation regulation system 48 comprises an air regulation apparatus 53 provided at least partly within ventilation openings 51 for regulating the air flow from air duct 50 through ventilation openings 51 into the destination area. Air regulation apparatus 53 comprises a number of air regulation drum members 52 that are fitted between a pair of spaced-apart side walls 54, 56 that extend from the edges of ventilation openings 51. Side walls 54, 56 have concave wall portions in facing register with each other such that each pair 54, 56 snugly receives therebetween a corresponding modular elongated air regulation drum member 52 that comprises a number of axially coextensive drum segments 60 that are joined in end-to-end relationship.

Figure 4:
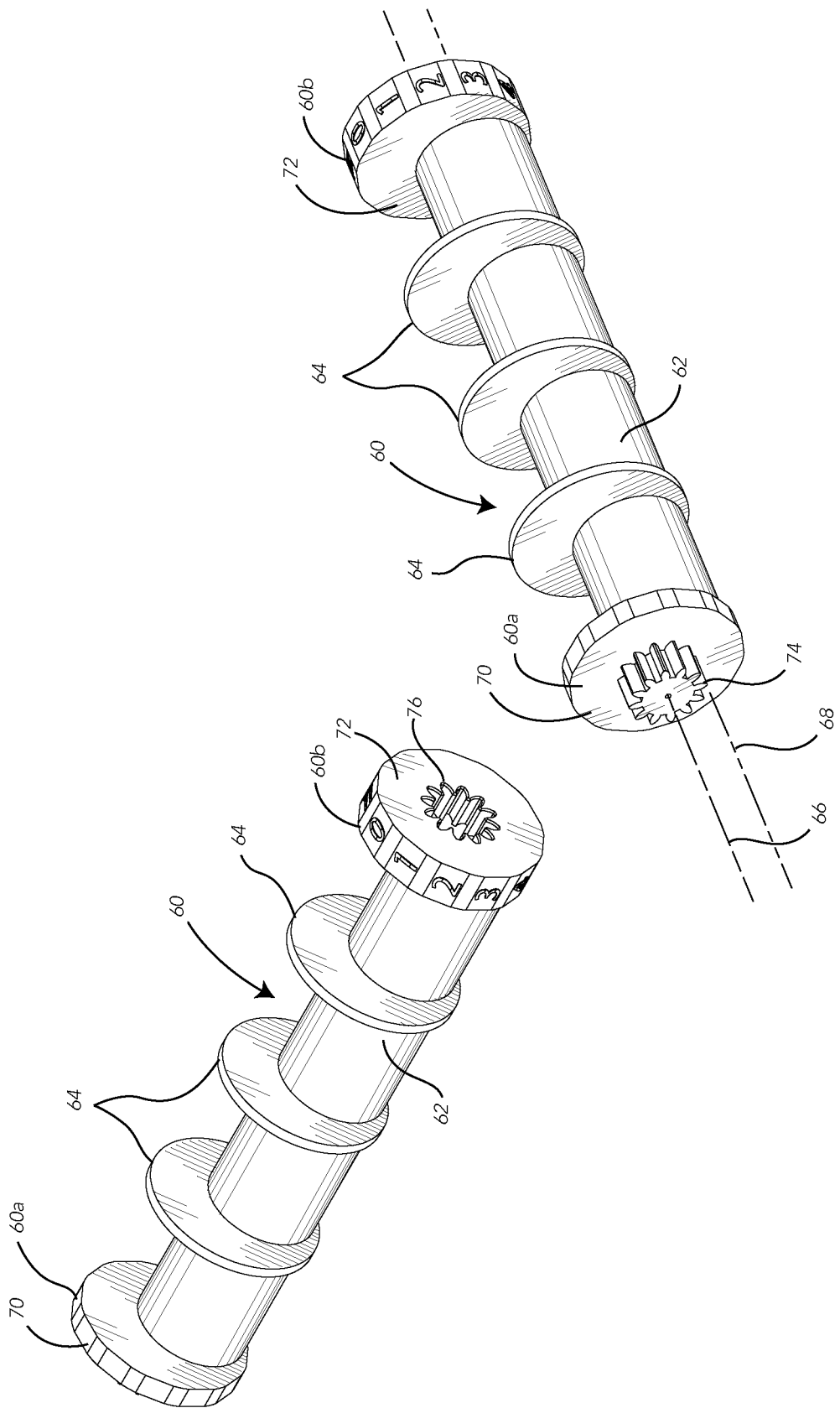
FIG. 4 is a perspective view of a pair of drum segments forming a drum member of the air regulation apparatus FIG. 1.
Figure 8:
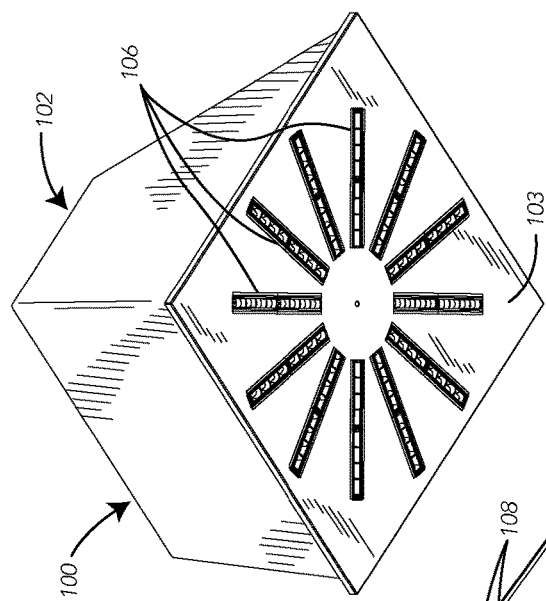
FIG. 8 is a bottom perspective view, at a smaller scale, of the ventilation regulation system of FIG. 7.
Figure 7:
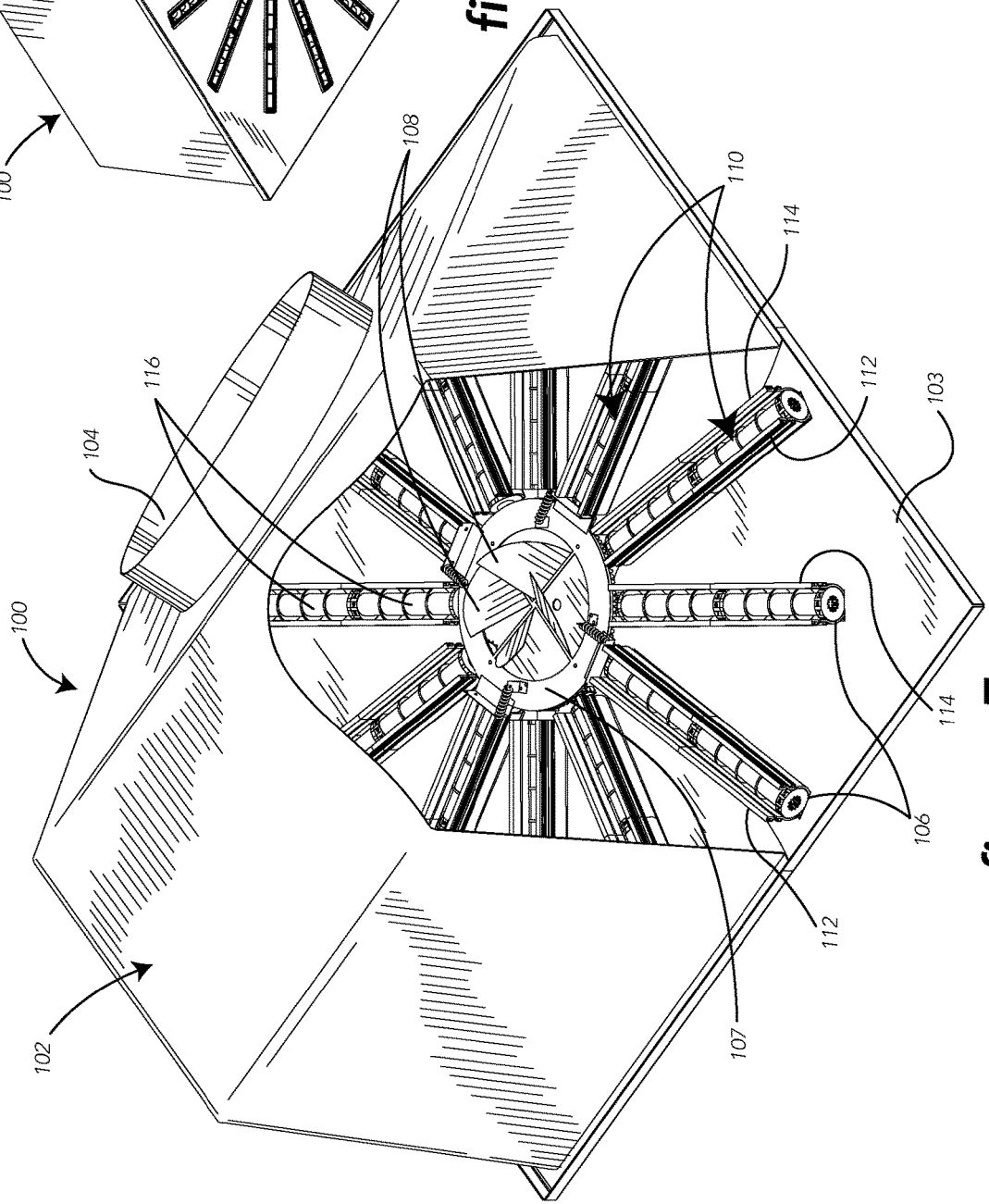
FIG. 7 is a top perspective view of a ventilation regulation system according to another embodiment of the invention, with the plenum casing being partly broken to show the air regulation apparatus therein.
Figure 9:
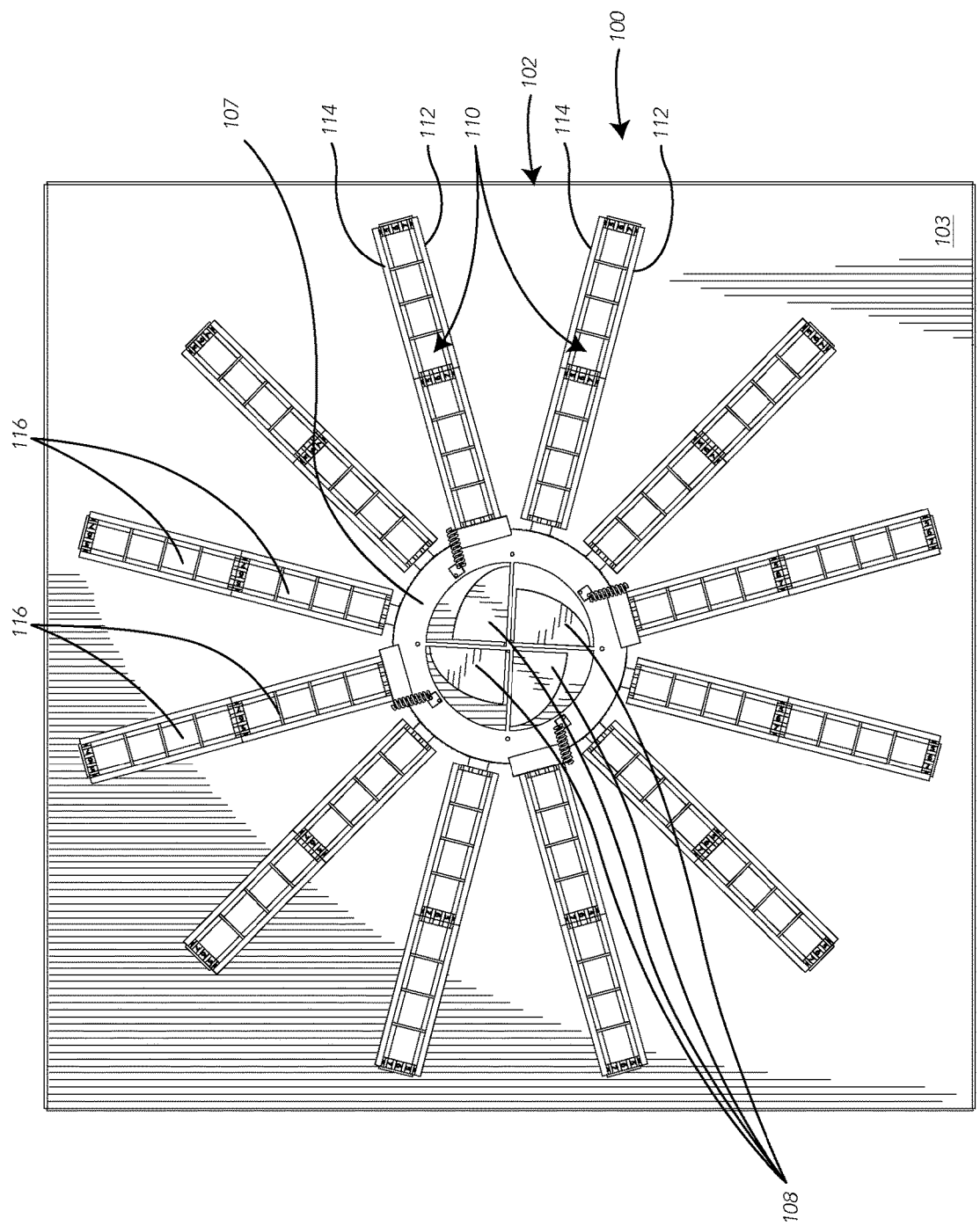
FIG. 9 is a top plan view of the bottom wall of the plenum casing together with the air regulation apparatus of the ventilation regulation system of FIG. 7.
Figure 10:
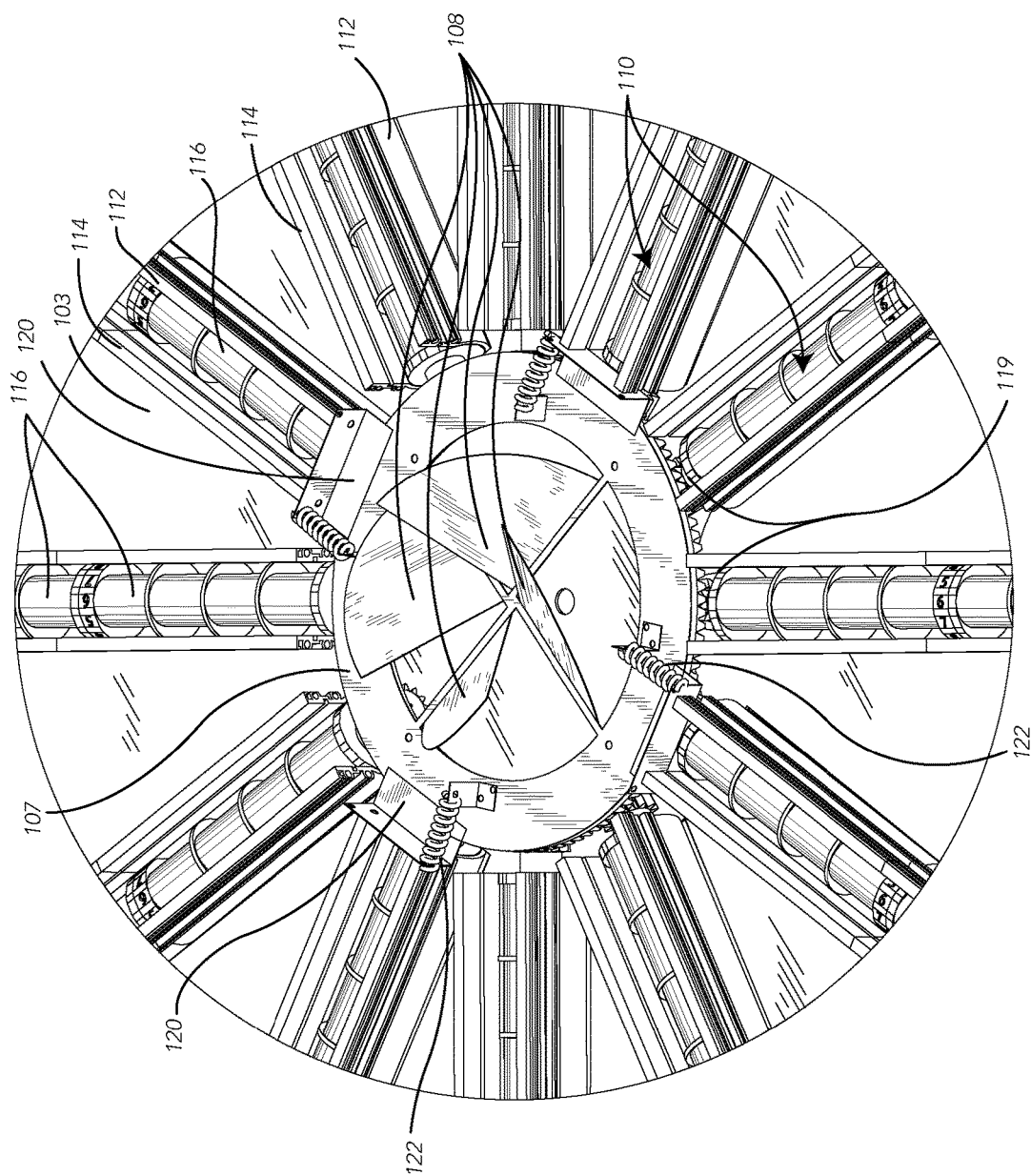
FIG. 10 is a perspective view at an enlarged scale of the central portion of the bottom wall of the plenum casing together with the air regulation apparatus of the ventilation regulation system of FIG. 7.

FIG. 4 shows two drum segments 60 that form part of a drum member 52, in disassembled condition. Both drum segments 60 are identical. Each drum segment 60 is elongated and has first and second ends 60a, 60b, a cylindrical main body 62 and a main body longitudinal axis 66 that extends through a center of cylindrical main body 62 between the drum segment first and second ends 60a, 60b. In one embodiment (not shown), the main body of drum member 52 could be of another shape than cylindrical, for example it could have an oval or polygonal cross-section.

A number of spaced apart annular fins 64 that extend radially about main body 62 are disposed about a fin axis 68 that extends through a center of the annular fins 64 between the drum segment first and second ends 60a, 60b. The main body longitudinal axis 66 is parallel but spaced apart from the fin axis 68. Although three fins 64 are illustrated, drum segment 60 could comprise any number. First and second ends 60a, 60b respectively comprise discoid end fins 70, 72 that are similar to the other fins 64 except that they are thicker. Fins 64 fit snugly between side walls 54, 56 such that the drum segment 60 will be rotatable within side walls 54, 56 about the fin axis 68.

A mechanical coupling comprising a pair of coupling members in the form of complementary male and female gear and toothed sleeve members 74, 76 are provided respectively at the first and second ends 60a, 60b of drum segment 60. Male gear members 74 are inserted within and interconnect with female toothed sleeve members 76 to allow operative mechanical coupling of coextensively adjacent drum segments 60 to result in unitary rotation of all linearly interconnected drum segments 60 of a drum member 52 about the common fin axis 68 of drum segments 60.

When a drum a segment 60 rotates, its main body 62, which is eccentrically disposed relative to fin axis 68, will rotate about fin axis 68, as seen in FIG. 5 where different positions of main body 62, numbered A to L, are illustrated. FIG. 5 indeed shows that fins 64 fit snugly within side walls 54, 56 that extend upwardly from ventilation opening 51; while cylindrical main body 62, as it rotates e.g. clockwise, will first be positioned away from opening 51 (position L), then move gradually downwardly along the right side wall 56 until it is positioned at opening 51 (positions A to F), and then gradually upwardly along the left side wall 54 until it is positioned away from opening 51 again (positions F to L). Different air flow patterns A to L from the air duct 50 out through ventilation opening 51 are shown with dark arrows: depending on the position of main body 62 relative to side walls 54, 56 and relative to ventilation opening 51, the air flows may be oriented straight downwardly, or at an angle to either side. Moreover, depending on the actual percentage of ventilation opening 51 that allows the air out, i.e. whether main body 62 blocks the ventilation opening 51 more or less, the speed of the air flow will vary. Indeed for a same positive air pressure in air duct 50, the smaller the effective opening, the higher the speed of the outcoming air flow, as suggested by longer arrows in positions A to L in FIG. 5.

FIG. 6 shows two identical drum segments 60', 60' according to an alternate embodiment. Each drum segment 60' is similar to drum segment 60 of FIG. 4, including a main body 62' and fins 64'; except that the male-female gear and geared sleeve members 74, 76 of drum segment 60 are replaced by female coupling members in the form toothed sleeves 76' at each end 60a', 60b' of drum segment 60'. A drum segment connector 78' having two ends 78a', 78b' that each represent a male coupling member, engages with those two ends 78a' 78b' the sleeves 76', 76' of two endwisely adjacent drum segments 60' whereby each two adjacent drum segments can be endwisely connected to each other to rotate as one.

According to another embodiment (not show), the drum segment connector could be longer and extend through a number of coextensive drum segments, including through all coextensive drum segments of a single drum member.

As shown in FIGS. 1-3, thermal actuators in the form of bimetallic coil actuators 80 are provided at one end of each drum member 52 and are more particularly each attached on the one hand to walls 54, 56 with an attachment plate 82; and on the other hand to the endmost drum segment 60 of a corresponding drum member 52, such that the thermal expansion or contraction of thermal coil actuator 80 will result in the rotation of its associated drum member 52. By means of the mechanical coupling of all drum segments 60 described above, the rotation of the endmost drum segment 60 of each drum member 52 will result in the rotation of all drum segments 60.

In use, when air flows through ventilation duct 50, it will be allowed out through openings 51 by passing through the air drum members 52 radially between the drum main bodies 62 and the diffuser side walls 54, 56; and axially between fins 64, 70, 72. The rotation of drum segments 60, and consequently the position of the eccentrically disposed drum main bodies 62 relative to the ventilation openings 51, will allow to control the air flow speed and/or orientation automatically depending on the air temperature being circulated in duct 50. Indeed, the air temperature will induce a mechanical extraction or contraction on the thermal coil actuators 80 that will in turn force a corresponding rotation of the drum segments 60 of drum members 52. Since the drum main bodies 62 are eccentrically disposed along the fin axis 68 of drum segments 60, the rotation of drum members 52 will adjust the position of drum main bodies 62 relative to the ventilation openings 51 as explained above with reference to FIG. 5.

For example, the disposition of drum main bodies 62, in view of a known and calibrated reaction of thermal coils 80, can be adjusted towards one side of the ventilation openings 51 to force the air out through the area between the drum main bodies 62 and the side of the ventilation opening 51, resulting in a sideways air flow orientation. If air duct 50 is placed on the ceiling of the room in which it is installed as usual, this sideways orientation means that the air flow will be parallel to and along the ceiling of the room, which is particularly desirable when cool air is injected into the room for air conditioning purposes as explained in the Background section. By injecting cool air along the ceiling, mixing of the cool air with the ambient air is enhanced.

On the other hand, if warm air is being injected into duct 50 instead, thermal coils 80 will react to this warmer temperature by expanding, resulting in the rotation of drum segments 60 to position the drum main bodies 62 centrally with respect to ventilation openings 51. This will allow air to flow on either side of drum cores 62 and out through ventilation openings 51, in a straight downward direction orthogonally, or diagonally but still partly downwardly, away from air duct 50 and away from the ceiling of the room. This is desirable since the warm air will be injected towards the bottom part of the room where the denser cooler air tends to naturally remain, again resulting in an enhanced mixing of air within the room.

Consequently, one advantage of the ventilation regulation system 48 of the invention is that the direction of the air flow injected into the room is controlled automatically; and that this control is simultaneous and common over each set of axially aligned drum members 52 due to the mechanical coupling between drum segments 60 that will rotate as one within a same air regulation apparatus 53 under the thermal extraction or retraction of the thermal actuators 80.

It is noted that the configuration of ventilation openings 51 may be different than that shown in the drawings, as long as the rotation of drum members 52 allows to adjustably block or deflect the air flow through said ventilation openings 51. For instance, side walls 54, 56 that help regulate the air flow through ventilation openings 51 with the movable main bodies 62 of the drum segments 60, while helpful to achieve this result, are not strictly necessary. The person skilled in the art will be able to design the appropriate ventilation opening configuration to regulate the airflow out of ventilation openings 51.

Also, in one embodiment, the side walls 54, 56 could actually be part of the drum segment, i.e. be sold as unit, for installation within the air duct or air plenum.

The modular configuration of the drum members 60 is particularly advantageous to allow producing a high number of individual drum segments that may be arranged in any number on ventilation regulation systems of different sizes and lengths, without requiring individual control of the drum segments since they may be interconnected with each other in end-to-end relationship that allows them to rotate as one. This is another advantage of the present invention.

Generally, any mechanical coupling mechanically linking the drum segments of the drum member may be used as long as a coordinated rotational movement is obtained for all drum segments. The actuator acts on at least one, but not all, of the drum segments of the drum member to rotate the drum segments, with the mechanical coupling consequently allowing all drum segments to be rotated when that drum segment being acted on is rotated.

FIGS. 7-10 show a ventilation regulation system 100 according to another embodiment of the invention. Ventilation regulation system 100 comprises a plenum casing 102 having an air inlet opening 104 destined to be operatively coupled to an air duct (not shown) for receiving air therein. Plenum casing 102 also comprises a bottom separating wall 103 (called the diffuser's face) that separates it from the room wherein air is to be injected, and a number of elongated ventilation openings 106 in bottom wall 103 for allowing air within plenum casing 102 to be supplied into a room. In this embodiment, the air supply area is consequently within plenum casing 102, and the destination area is the room on the other side of bottom wall 103.

Ventilation regulation system 100 comprises an air regulation apparatus that in turn comprises a discoid blade connector 107. Ventilation openings 106 are located about and extend radially away from discoid blade connector 107 that is rotatable above casing bottom wall 103 and disposed centrally between ventilation openings 106. Blades 108 are fixed to the upper surface of blade connector 107 and extend upwardly therefrom at an appropriate angle so as to be impacted by the air incoming through air inlet 104 from the air duct so as to force blade connector 107 to rotate when air is injected into plenum casing 102.

Air regulation apparatus further comprises a number of drum members 110 that are similar to drum members 52 of the first embodiment. Each drum member 110 is fitted between side walls 112, 114 that extend from casing bottom wall 103 on each side of a corresponding ventilation opening 106. Each drum member 110 comprises drum segments 116 that are coextensively interconnected in end-to-end relationship with a mechanical coupling as described hereinabove.

The innermost end of each drum member 116 comprises a male gear 118 that is mechanically coupled to an annular gear 119 provided on the external periphery of the bottom surface of discoid blade connector 107, such that rotation of blade connector 107 will result in the rotation of each individual drum member 110. Retaining plates 120 in the form of angle irons are attached to the side walls 112, 114 of a few of the air diffusers 110 such that blade connector 107 is sandwiched between retaining plates 120 and the innermost male gears 118 of drum members 110. A biasing member in the form of coil springs 122 that are attached to both the fixed retaining plates 120 and to the rotatable blade connector 107 continuously biases central disc 107, and consequently drums members 110, towards a first position, while air flowing into plenum casing 102 through air inlet 104 will impact blades 108 and will force blade connector, and consequently drum members 110, towards a second direction opposite the first direction, against the action of coil springs 122.

In use, ventilation regulation system 100 allows to control the direction and/or the speed of the air flow through outlet openings 106 as a result of the speed of the air flow into plenum casing 102. For example, according to this embodiment, the air speed can be controlled specifically to maintain a constant air throw, i.e. the distance that the air stream will travel when it flows out of plenum casing 102, even if the incoming air speed into plenum casing 102 varies. More particularly, the higher the air speed into plenum casing 102, the more pressure will be applied on blades 108. This will force rotation of blade connector 107 towards its second position away from the above-mentioned first position, against the bias of coil springs 122. As a result of this higher air speed, the drum members 110 will be rotated such that their eccentric drum main bodies will move to free a greater proportion of the ventilation openings 106, to allow the air flow out of the ventilation openings 106 through a greater air outlet area. By increasing the air outlet area the air speed out of plenum casing 102 will be lower. Inversely, if the air speed into plenum casing 102 is lower, the coil springs 122 will bias the drum members 110 to have their drum main bodies blocking a greater proportion of the ventilation openings 106, which will result in the air flow out through ventilation openings 106 through a smaller outlet area, which in turn means at higher speed. The air throw can consequently be relatively constant even if the air speed into plenum casing 102 varies.

Ventilation regulation system 100 consequently allows the air throw out of plenum casing 102 to be controlled automatically as a result of the air speed into plenum casing 102, through the control of the drum members 110 that are coupled to the central blade connector 107 that is reactive to air speed as mentioned above.

Figure 11:
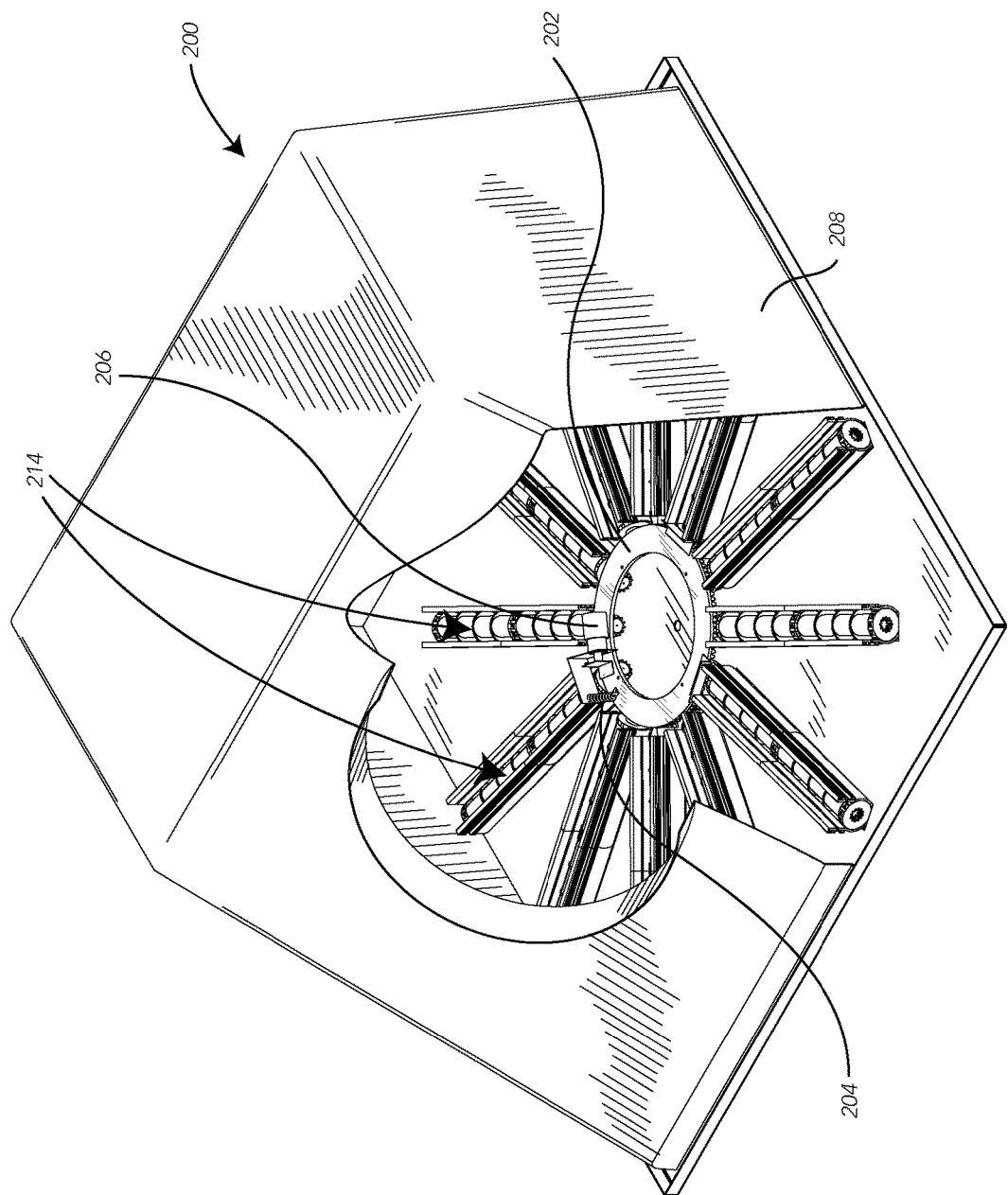
FIG. 11 is a perspective view of a ventilation regulation system according to another embodiment of the invention, with the plenum casing being partly broken to show the air regulation apparatus therein.
Figure 12:
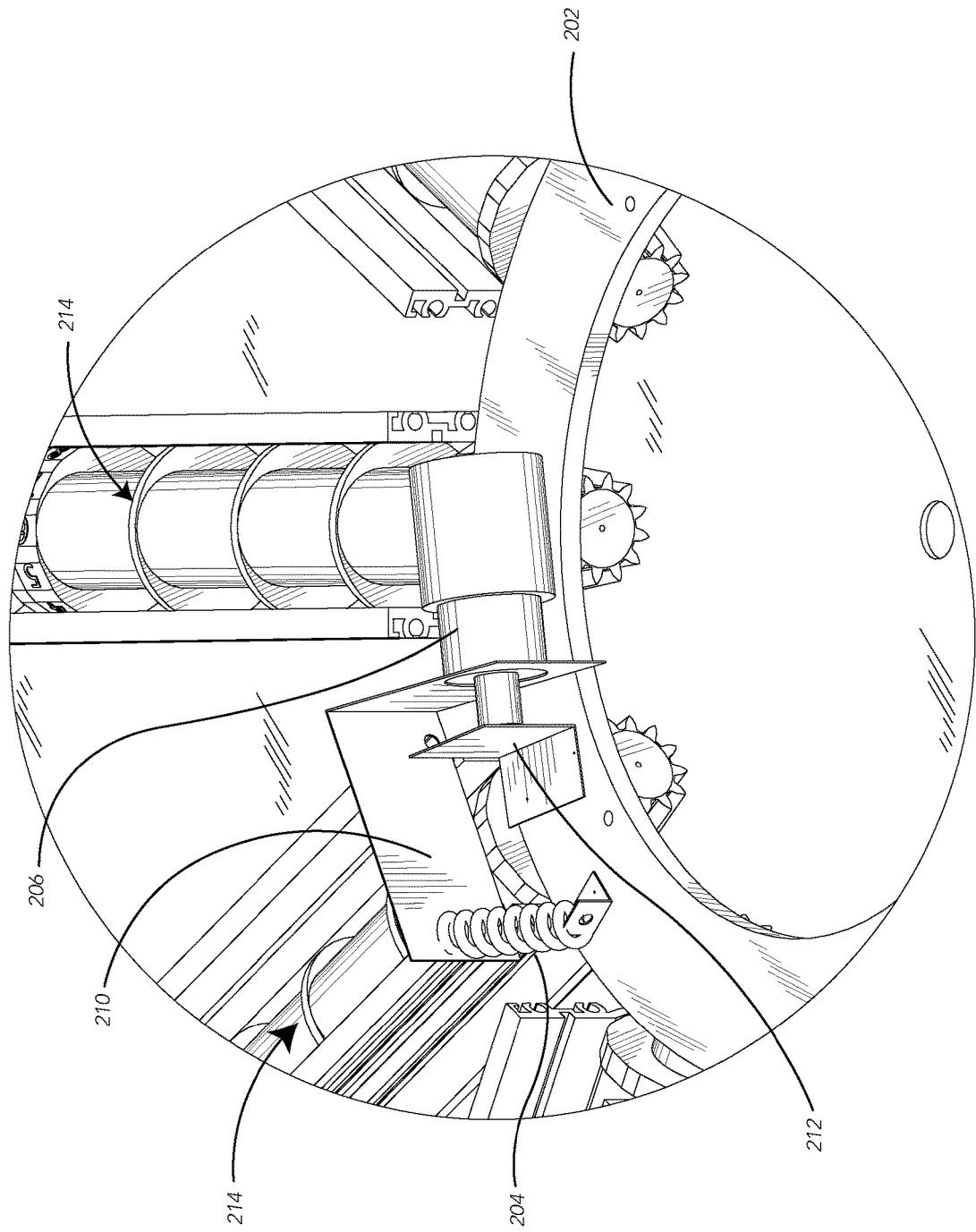
FIG. 12 is a perspective view at an enlarged scale of the central portion of the bottom wall of the plenum casing together with the air regulation apparatus of the ventilation regulation system of FIG. 11.

FIGS. 11-12 show a ventilation regulation system 200 according to another embodiment of the invention which is similar to ventilation regulation system 100, except that the rotation of the central disc 202 against the bias of coil spring 204 is controlled through a thermal piston actuator 206 to react to the temperature of the air flowing into the plenum casing 208 instead of reacting to the air speed. The speed and/or the orientation of the air flow out of ventilation openings can consequently be automatically controlled as a result of the air temperature within plenum casing 208. More specifically, the coil spring 204 is attached to a fixed retaining plate 210 that is fixed relative to plenum casing 208 at one end, and to the central disc 202 at the other end. The movable rod of the thermal piston actuator 206 is linked to central disc 202 by means of an iron angle 212, while the cylinder of thermal piston actuator 206 is attached to retaining plate 210. When cooler air is injected into plenum casing 208, the piston of thermal piston actuator 206 retracts, allowing disc 202 to be forced under the bias of coil spring 204 into a first position where drum members 214 have their drum main bodies located laterally with respect to the underlying ventilation outlet openings such that the cool air will be injected laterally and parallel to the ceiling of the room. When warmer air is injected into plenum casing 208, the piston of thermal piston actuator 206 is extracted which forces disc 202 to rotate against the bias of coil spring 204, to in turn rotate drum members 214 such that their drum main bodies will be located centrally with respect to the underlying ventilation openings of plenum casing 208 to allow air to be injected downwardly and orthogonally away from the ceiling of the room.

Figure 13:
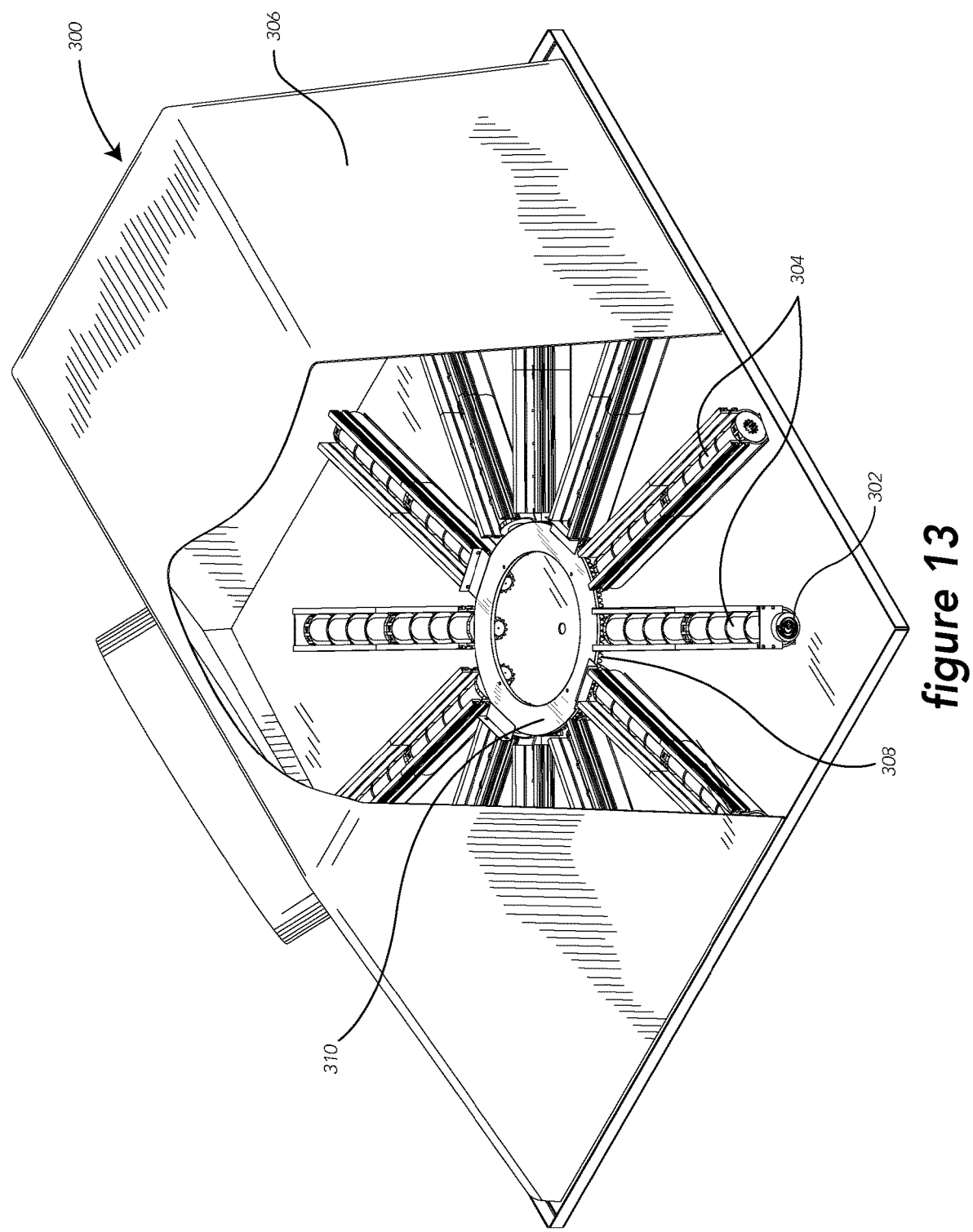
FIG. 13 is a top perspective view of a ventilation regulation system according to another embodiment of the invention, with the plenum casing being partly broken to show the air regulation apparatus therein.
Figure 15:
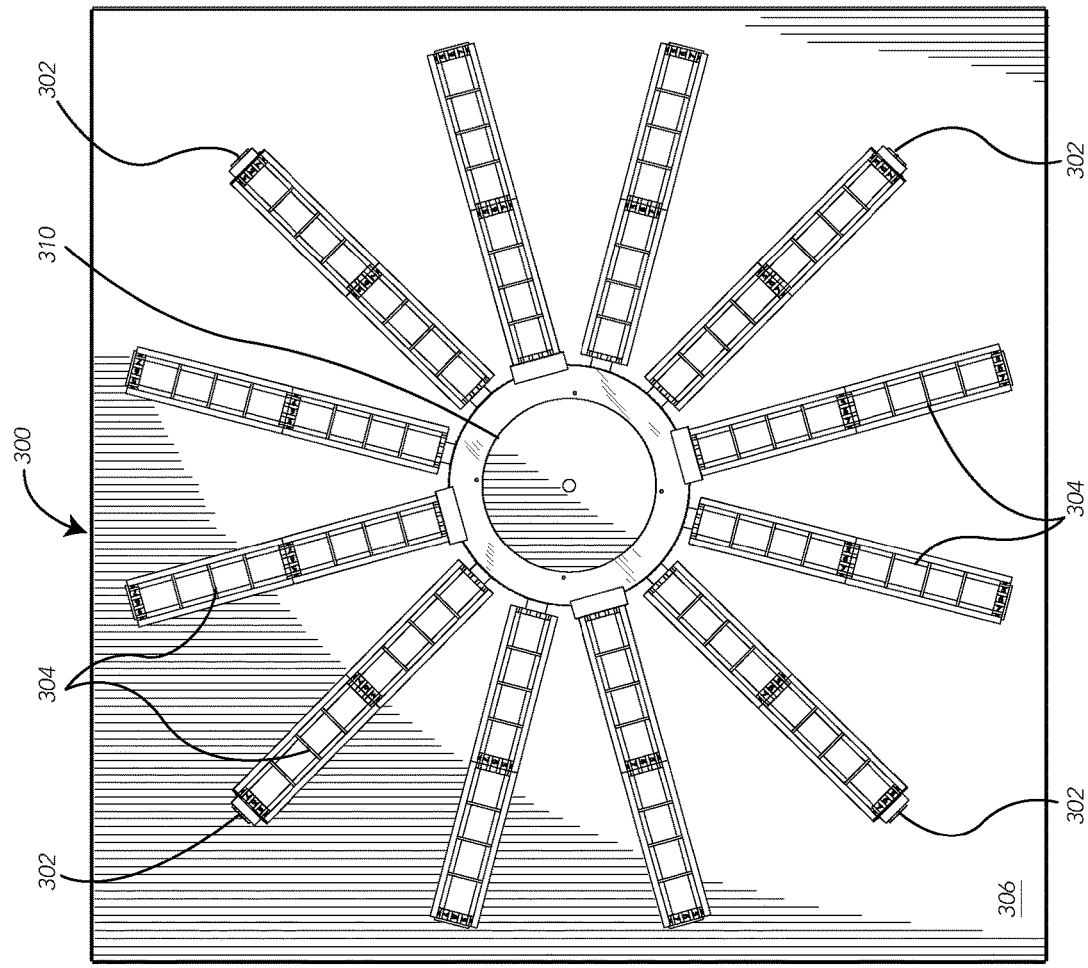
FIG. 15 is a top plan view of the bottom wall of the plenum casing together with the air regulation apparatus of the ventilation regulation system of FIG. 13.
Figure 14:
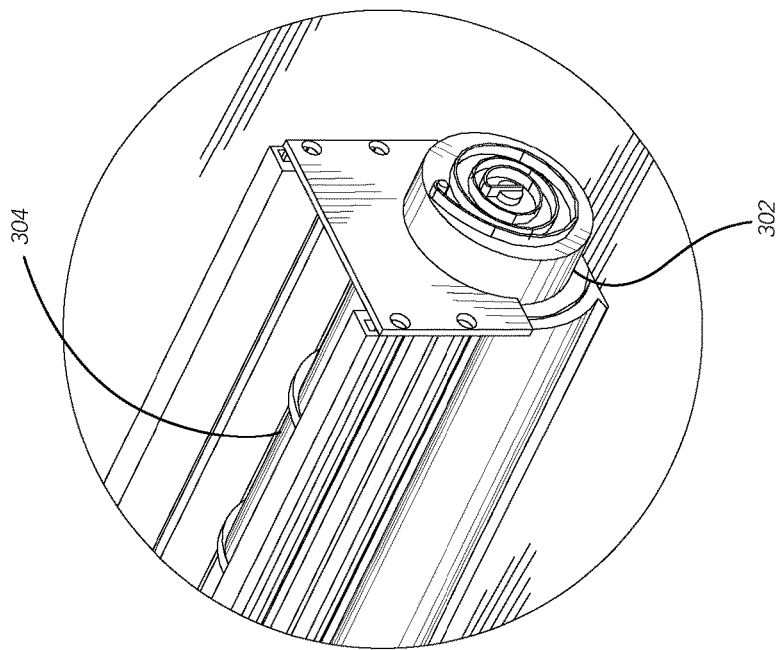
FIG. 14 is a perspective view, at a larger scale, of one end of a drum member of the ventilation regulation system of FIG. 13.

FIGS. 13-15 show a ventilation regulation system 300 according to another embodiment of the invention. Ventilation regulation system 300 uses a number of thermal coil actuators 302 to control the rotation of drum members 304 as a result of the air temperature inside plenum casing 306 instead of using a combination of a thermal piston actuator with a coil spring, as in the previous embodiment. While four thermal coil actuators are shown, any number can be used, since the rotation of all drum members will be induced simultaneously through their mechanical coupling to the gear 308 of central disc 310.

Figure 16:
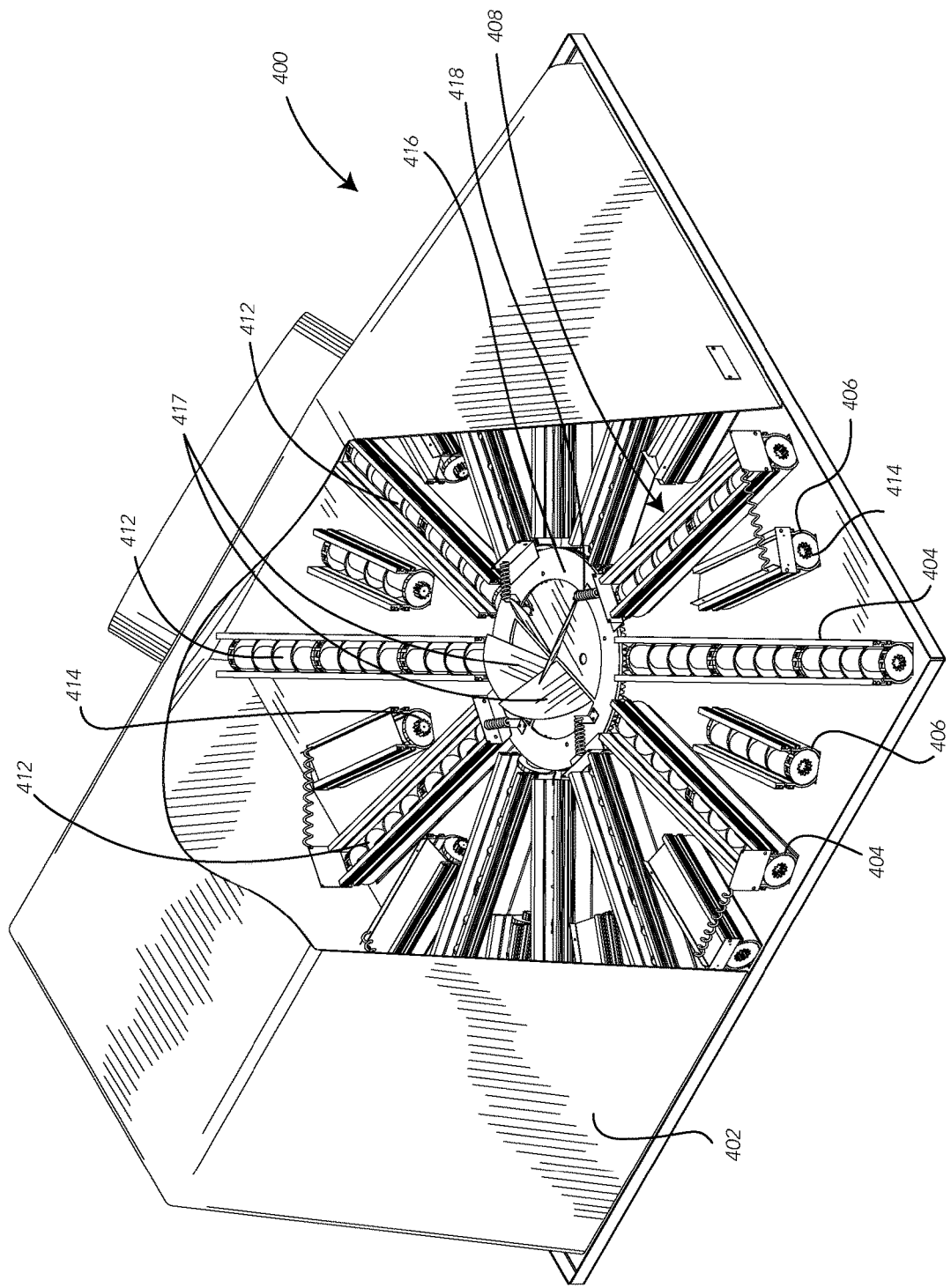
FIG. 16 is a top perspective view of a ventilation regulation system according to another embodiment of the invention, with the plenum casing being partly broken to show the air regulation apparatus therein.

FIGS. 16-18 show a ventilation regulation system 400 according to another embodiment of the invention. Ventilation regulation system 400 allows controlling both the effective area of the air flow exiting the plenum casing 402 through its ventilation openings, which in turn means controlling the speed at which the air will be injected into the room; and/or the direction of the air flow out of plenum casing 402.

More particularly, plenum casing 402 comprises first ventilation openings 404 similar to the ventilation openings of systems 200 and 300; but also comprises a number of elongated second ventilation openings 406 each located between a pair of first ventilation openings 404 and being shorter in length then the first ventilation openings 404—although different sizes and dispositions could be envisioned for second ventilation openings 406. The air regulation apparatus 408 comprises first and second drum members 412, 414 that are respectively provided on the first and second ventilation openings 404, 406. The central disc 416 is equipped with blades 417 and is biased towards a first position by means of a disc coil springs 418 as in system 200, to rotate as a result of the air speed against blades 417 against the action of coil springs 418.

According to this embodiment of the invention, shutters 420 are provided atop at least some of the second drum members 414. Shutters 420 are movable between an opened position and a closed position by means of shutter thermal springs 422 that link the shutters to the plenum casing 402. Thermal springs 422 will force shutters 420 to close when warm air is injected inside plenum 402 and to open when cool air is injected inside plenum 402. By reducing the number of ventilation openings through which the warm air is injected into the room through plenum casing 402, and consequently the effective air injection area of ventilation openings, for a same air speed into plenum casing 402, this will increase the speed of the air being injected, which will allow the warm air to be injected further down and away from the ceiling of the room, which is desirable to counter its lesser density that would naturally have the warmer air remain in the upper portion of the room. The thermal spring actuator system could be replaced by a thermal coil actuator system shown in the other embodiments.

Although only some of the second drum members 414/second ventilation openings 406 are provided with shutters in the embodiment of FIGS. 16-18, they could be provided on fewer or more, including on all second ventilation openings 406.

Figure 19:
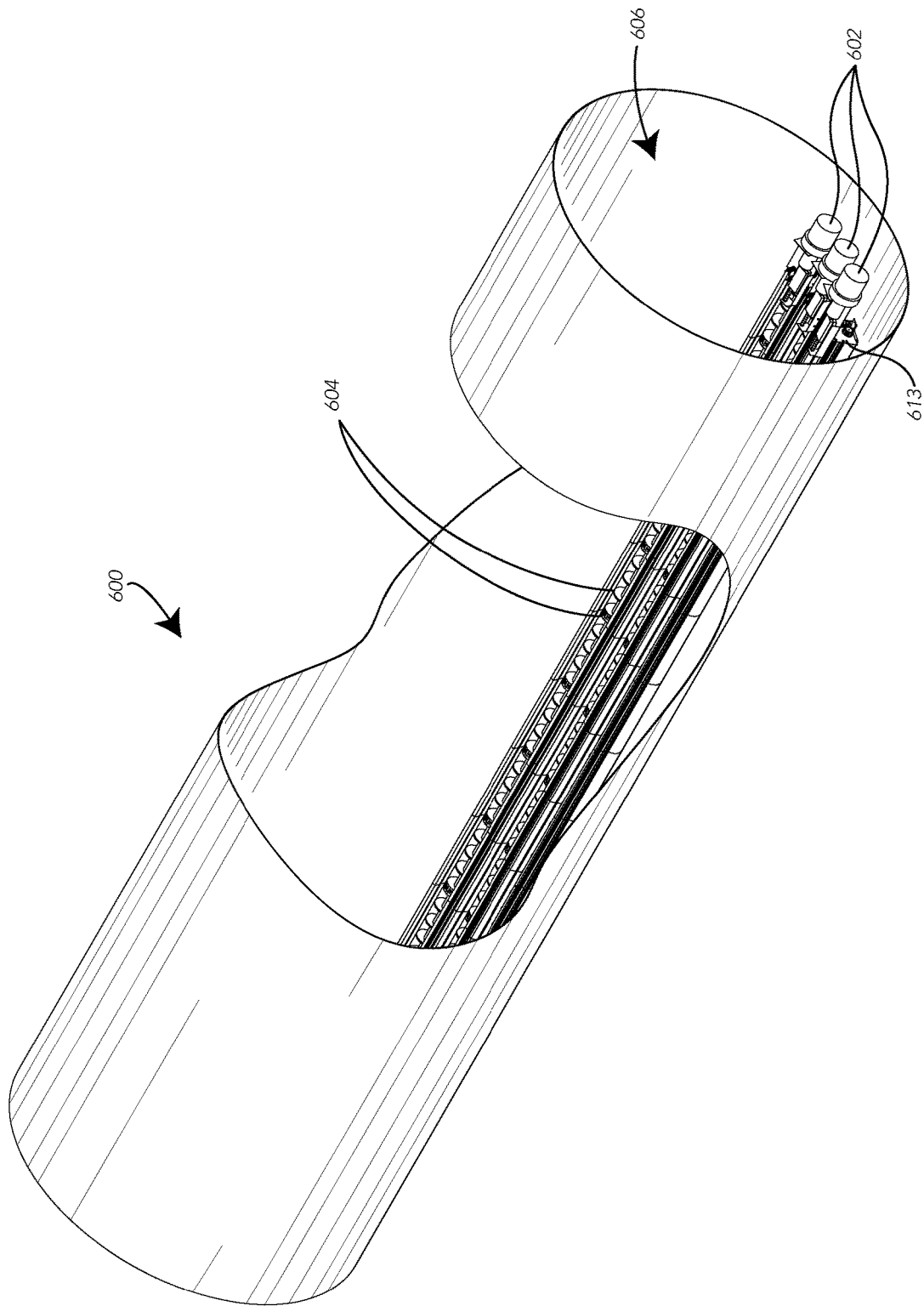
FIG. 19 is a perspective view of a ventilation regulation system according to another embodiment of the invention, showing part of a ventilation duct shown that is partly broken to show the air regulation apparatus therein.
Figure 20:
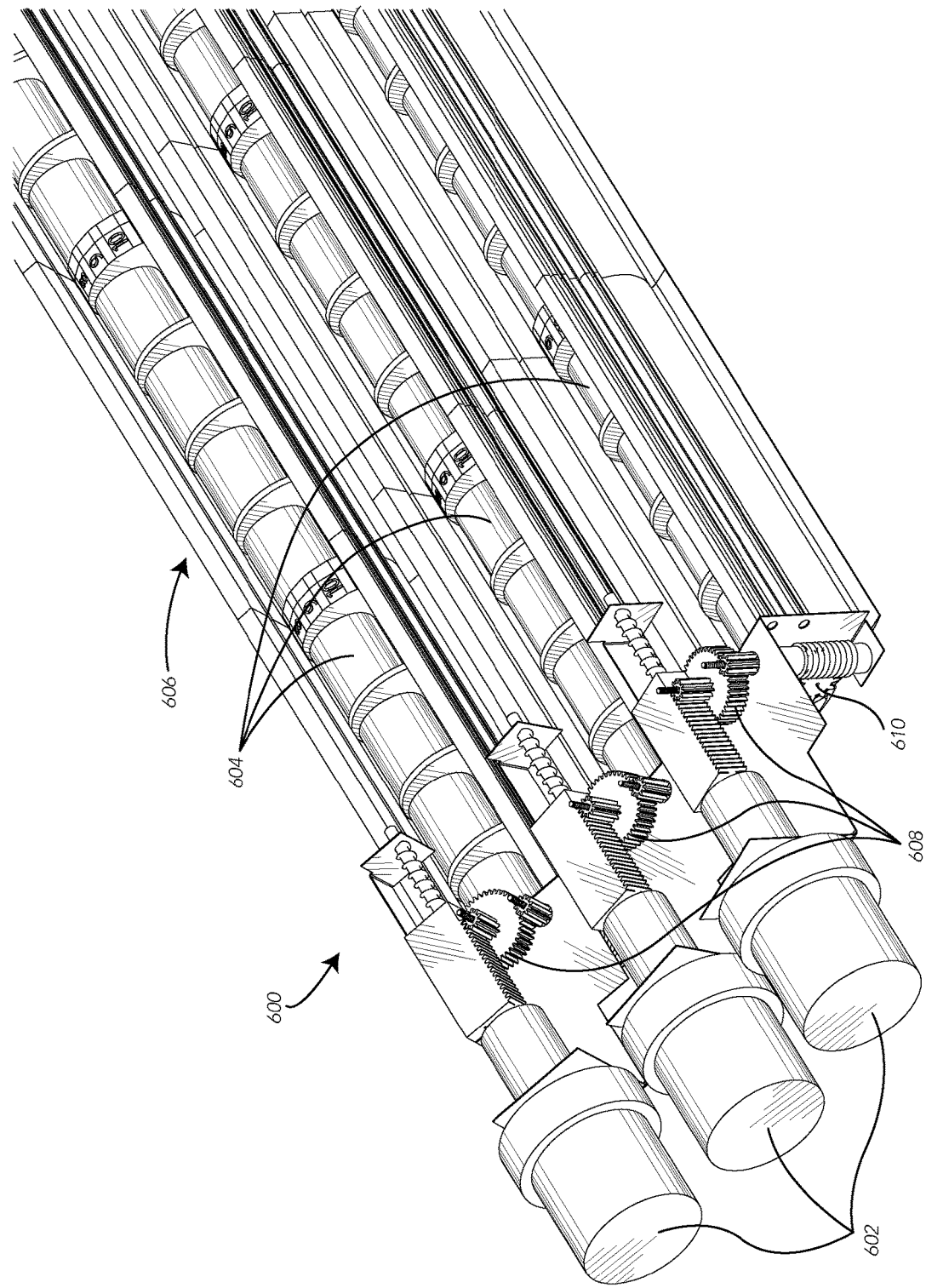
FIG. 20 is an enlarged perspective view of a portion of one end of the air regulation apparatus of the ventilation regulation system of FIG. 19.

FIGS. 19-20 show a ventilation regulation system 600 according to another embodiment, somewhat similar to ventilation regulation system 48 of the first embodiment, with the difference that the bimetallic coil actuators 80 of the first embodiment are replaced by thermal pistons 602 that actuate the rotation of drum members 604 of the air regulation apparatus 606. Each thermal piston 602 is linked by means of a rack and gear mechanism 608 to a pinion gear 610 that is in turn mechanically coupled to drum member 606. Pistons 602 can force drum members 606 towards a second position against the bias of coil springs 612 that continuously bias drum members towards a first position. Air speed and/or direction can be controlled through ventilation openings 613 by the rotation of drum members 604 between their first and second positions, which is in turn reactive to the air temperature within air duct 614.

We claim:

1. A ventilation regulation system for conducting air being forced from an air supply area to a destination area, comprising:
a separating wall between said air supply area and said destination area;
a ventilation opening through said separating wall for allowing air flow through said separating wall;
an air regulation apparatus provided at least partly within said ventilation opening for regulating the air flow through the ventilation opening, said air regulation apparatus comprising:
a modular air regulation drum member that has a number of rotatable drum segments that can each rotate to adjustably block or deflect the air flow through said ventilation opening such that at least one among a direction, a speed and a debit rate of air is controlled through the ventilation opening;
a mechanical coupling mechanically linking said rotatable drum segments of said modular air regulation drum member into a coordinated rotational movement; and
an actuator acting on at least one, but not all, of said rotatable drum segments of said modular air regulation drum member to rotate said at least one of said rotatable drum segments, with the mechanical coupling allowing all of the rotatable drum segments to be rotated when said at least one rotatable drum segment is rotated.

2. A ventilation regulation system as defined in claim 1, wherein each said rotatable drum segment comprises:
a generally cylindrical main body that has a longitudinal axis that extends through a center of said generally cylindrical main body between a first end and a second end of the rotatable drum segment;
annular fins that extend radially about said generally cylindrical main body and that are disposed about a fin axis that extends through a center of said annular fins between the first end and the second end of the rotatable drum segment, with said longitudinal axis of said generally cylindrical main body being parallel but spaced apart from said fin axis; and
coupling members, which at least partly compose said mechanical coupling, at each end of said rotatable drum segment for allowing said rotatable drum segment to be attached to other rotatable drum segments in an end-to-end relationship to form said modular air regulation drum member;
wherein when said rotatable drum segment rotates, said generally cylindrical main body moves relative to said ventilation opening.

3. A ventilation regulation system as defined in claim 2, wherein the separating wall comprises elongated side walls on either side of said ventilation opening that have an arcuate portion between which said rotatable drum segments can rotate about said fin axis, with said generally cylindrical main body further moving relative to said elongated side walls when said rotatable drum segment rotates.

4. A ventilation regulation system as defined in claim 1, wherein said actuator automatically rotates said rotatable drum member in reaction to a determined value of a parameter of the air being injected into the air supply area, the parameter being one of the debit rate, a pressure, a temperature, and a speed.

5. A ventilation regulation system as defined in claim 4, wherein said actuator comprises a thermal actuator capable of rotating the rotatable drum member as a result of the temperature of the air flowing into the air supply area.

6. A ventilation regulation system as defined in claim 1, wherein a number of said rotatable drum segments are joined in an end-to-end relationship to form said rotatable drum member, with said mechanical coupling comprising, on each said rotatable drum segment, a male coupling member at a first end and a complementary female coupling member on a second end, whereby each two adjacent rotatable drum segments are configured to be endwisely attached to each other with their respective male and female coupling members engaging one another.

7. A ventilation regulation system as defined in claim 6, wherein said male coupling member comprises a geared outer surface and said female coupling member comprises a complementary toothed sleeve to receive said geared outer surface of said male coupling member therein.

8. A ventilation regulation system as defined in claim 1, wherein said rotatable drum segments are joined in end-toend relationship to form said modular air regulation drum member, with said mechanical coupling comprising:
- on each said rotatable drum segment, a female coupling member at each end of each said rotatable drum segment; and
- a drum segment connector having a pair of male coupling members engaging the female coupling members of two endwisely adjacent rotatable drum segments whereby each two adjacent rotatable drum segments are configured to be endwisely connected to each other.

9. A ventilation regulation system as defined in claim 8, wherein said male coupling members comprise a geared outer surface and said female coupling members comprise a complementary toothed sleeve to receive said geared outer surface of said male coupling members therein.

10. A ventilation regulation system as defined in claim 1 further comprising additional spaced-apart ventilation openings, with said air regulation apparatus being also provided at least partly within said additional spaced-apart ventilation openings for regulating the air flow through the additional ventilation openings, said air regulation apparatus further comprising:
- additional modular air regulation drum members that each have a number of rotatable drum segments that can each rotate to adjustably block or deflect the air flow through said additional spaced-apart ventilation openings for controlling at least one among the direction, the speed and the debit rate of air through the additional spaced-apart ventilation openings; and
- a mechanical coupling mechanically linking said rotatable drum segments of all said modular air regulation drum members into a coordinated rotational movement;
- wherein said actuator acts on at least one, but not all, of said rotatable drum segments of all said modular air regulation drum members to rotate said at least one of said rotatable drum segments, with the mechanical coupling allowing all said rotatable drum segments to be rotated when said at least one rotatable drum segment of one modular air regulation drum member is rotated.

11. A ventilation regulation system as defined in claim 10, wherein said actuator comprises blades disposed in said air supply area, said blades linked to a blade connector linked to said modular air regulation drum members, such that an air speed within the air supply area will correspondingly force said blade connector to move which will, in turn, rotate said rotatable drum members.

12. A ventilation regulation system as defined in claim 11, wherein said blade connector is rotatable, and said ventilation openings and said rotatable drum members extend radially away from said blade connector.

13. An air regulation apparatus for use with a ventilation regulation system for conducting air being forced from an air supply area to a destination area, the ventilation regulation system of the type comprising a separating wall between the air supply area and the destination area and a ventilation opening through the separating wall for allowing air flow therethrough, said air regulation apparatus for installation at least partly within the ventilation opening for regulating the air flow through the ventilation opening, said air regulation apparatus comprising:
- a modular air regulation drum member that has a number of rotatable drum segments that can each rotate to adjustably block or deflect the air flow through said ventilation opening such that at least one among a direction, a speed and a debit rate of air is controlled through the ventilation opening;
- a mechanical coupling mechanically linking all the rotatable drum segments of said at least one modular air regulation drum member into a coordinated rotational movement; and
- an actuator acting on at least one, but not all, of said rotatable drum segments of said modular air regulation drum member to rotate said at least one of said rotatable drum segments, with the mechanical coupling allowing all the rotatable drum segments to be rotated when said at least one of the rotatable drum segment is rotated.

14. An elongated drum segment for use in forming, with other elongated drum segments, a modular air regulation drum member that is part of an air regulation apparatus of a ventilation regulation system, the elongated drum segment having a first end and a second end and comprising:
- a generally cylindrical main body having a longitudinal axis that extends through a center of said generally cylindrical main body between the first end and the second end of the elongated drum segment; and
- a mechanical coupling member at each end of said elongated drum segment for allowing said elongated drum segment to be attached to the other elongated drum segments in end-to-end relationship for forming the modular air regulation drum member for use in blocking or deflecting an air flow through a ventilation opening for adjusting at least one among a direction, a speed and a debit rate of air through the ventilation opening.

15. A drum segment as defined in claim 14, further comprising:
- annular fins that extend radially about said generally cylindrical main body and that are disposed about a fin axis that extends through a center of said annular fins between the first end and the second end of the elongated drum segment, with said generally cylindrical main body longitudinal being parallel but spaced apart from said fin axis; and
- elongated side walls having an arcuate portion between which said annular fins are snugly rotatably fitted, with said generally cylindrical main body moving relative to said elongated side walls when said elongated drum segment rotates between the elongated side walls about said fin axis.

* * * * *